(12) United States Patent
Messerschmid et al.

(10) Patent No.: US 10,035,692 B2
(45) Date of Patent: Jul. 31, 2018

(54) FUNNEL AND RECEPTACLE DEFINED BY THE FUNNEL

(71) Applicants: Uwe Messerschmid, Albershausen (DE); Holger Aubele, Boehnenkirch (DE); Werner Stahlecker, Goeppingen (DE)

(72) Inventors: Uwe Messerschmid, Albershausen (DE); Holger Aubele, Boehnenkirch (DE); Werner Stahlecker, Goeppingen (DE)

(73) Assignee: MICHAEL HOERAUF MASCHINENFABRIK GMBH U. CO. KG, Donzdorf (DE)

( * ) Notice: Subject to any disclaimer, the term of this patent is extended or adjusted under 35 U.S.C. 154(b) by 0 days.

(21) Appl. No.: 14/980,813

(22) Filed: Dec. 28, 2015

(65) Prior Publication Data

US 2016/0236925 A1    Aug. 18, 2016

Related U.S. Application Data

(62) Division of application No. 13/199,479, filed on Aug. 31, 2011, now Pat. No. 9,233,822.

(Continued)

(30) Foreign Application Priority Data

Sep. 3, 2010 (DE) .................. 10 2010 045 176

(51) Int. Cl.
   B65D 25/00 (2006.01)
   B67C 11/00 (2006.01)
   (Continued)

(52) U.S. Cl.
   CPC ............ *B67C 11/00* (2013.01); *B29C 51/082* (2013.01); *B65D 3/04* (2013.01); *B65D 3/06* (2013.01);
   (Continued)

(58) Field of Classification Search
   CPC .............. B65B 39/007; B65B 67/1238; B65B 67/1205; B65D 83/06; B65D 3/06
   (Continued)

(56) References Cited

U.S. PATENT DOCUMENTS 1,128,785 A    2/1915  House
3,953,566 A    4/1976  Gore
(Continued)

FOREIGN PATENT DOCUMENTS

DE        296471      2/1917
EP    2 199 222 A2    6/2010
(Continued)

OTHER PUBLICATIONS

Manning, "Paper Envelope Used as a Funnel." in Popular Mechanics, vol. 56, No. 1 (Jul. 1931), p. 137.
(Continued)

*Primary Examiner* — Shawn M Braden
(74) *Attorney, Agent, or Firm* — Flynn, Thiel, Boutell & Tanis, P.C.

(57) ABSTRACT

A method for fabricating a funnel, a tool for carrying out the method, and a funnel of flat material, more particularly of plastic-coated paper. A receptacle for a pulverulent and/or liquid medium includes a funnel disposed in a pouring or discharging region. A blank of flat material is shaped to a funnel-shaped sleeve having an outlet opening, an inlet opening, and an opening angle, and the funnel-shaped sleeve is swaged in at least one subregion to effect enlargement of the opening angle.

11 Claims, 11 Drawing Sheets

Related U.S. Application Data (60) Provisional application No. 61/461,440, filed on Jan. 18, 2011.

(51) Int. Cl.

| | | |
|---|---|---|
| *B29C 51/08* | (2006.01) |
| *B65D 3/04* | (2006.01) |
| *B65D 3/06* | (2006.01) |
| *B65D 83/06* | (2006.01) |
| *B65B 39/00* | (2006.01) |
| *B31B 50/00* | (2017.01) |
| *B31B 100/00* | (2017.01) |

(52) U.S. Cl.
CPC ............ *B65D 83/06* (2013.01); *B31B 50/001* (2017.08); *B31B 2100/002* (2017.08); *B65B 39/007* (2013.01)

(58) Field of Classification Search
USPC ........................................................ 220/694
See application file for complete search history.

(56) References Cited

U.S. PATENT DOCUMENTS

| | | |
|---|---|---|
| 5,186,882 A | 2/1993 | Hafner |
| 6,343,710 B1 | 2/2002 | Rubin |
| 2002/0074247 A1* | 6/2002 | Tremblay ............... B65D 5/008 206/223 |
| 2005/0011035 A1 | 1/2005 | Rukavina et al. |
| 2009/0090791 A1* | 4/2009 | Dorenbusch ....... A01G 13/0281 239/1 |
| 2009/0127296 A1* | 5/2009 | Parker ................... B65B 39/007 222/527 |
| 2010/0155461 A1 | 6/2010 | Stahlecker |
| 2011/0036454 A1 | 2/2011 | Saito et al. |

FOREIGN PATENT DOCUMENTS

| | | | |
|---|---|---|---|
| GB | 819 832 | 9/1959 | |
| GB | 1 567 162 | 5/1980 | |
| JP | 2009-262957 | 11/2009 | |
| WO | WO 2007/009170 A1 | 1/2007 | |
| WO | WO 2007009170 A1 * | 1/2007 | ......... A61B 10/0045 |
| WO | WO 2009/130916 A1 | 10/2009 | |

OTHER PUBLICATIONS

Office Action in European Patent Office issued in European Application No. 11 177 676.1 dated Oct. 12, 2012 (6 pages).

Search Report issued in European Patent Office for Application No. 11177676.1 dated Jan. 19, 2012 with English translation of categories of cited documents (7 pages).

\* cited by examiner

FUNNEL AND RECEPTACLE DEFINED BY THE FUNNEL

CROSS-REFERENCE TO RELATED APPLICATIONS

This is a divisional of prior U.S. application Ser. No. 13/199,479, filed Aug. 31, 2011, which claims the benefit of German Application No. 10 2010 045 176.2, filed Sep. 3, 2010, and U.S. Provisional Application No. 61/461,440, filed Jan. 18, 2011, all of which are hereby incorporated by reference in their entirety.

FIELD OF THE INVENTION

The invention relates to a method for fabricating a funnel, to a tool for carrying out said method, and to a funnel made of flat material, more particularly plastic-coated paper. The invention further relates to a receptacle intended for a pulverulent and/or liquid medium and comprising a funnel disposed in a pouring or discharging region.

BACKGROUND OF THE INVENTION

A receptacle that is intended for a pulverulent or liquid medium and comprises a funnel disposed in a pouring or discharging region, also referred to as the outlet region, is disclosed in JP 2009-262957 A, for example. The receptacle disclosed is in the form of a substantially circularly cylindrical tube, into which the funnel is inserted. The inserted funnel serves to improve pouring or discharging the medium. According to JP 2009-262957 A, the funnel is molded from a plastics material. Molding of a funnel of this kind is carried out, for example, by an injection-molding procedure allowing for the production of complex shapes.

In the case of nonreturnable packaging, in particular, it is required to reduce the use of plastics materials in such packaging, in order to achieve more cost-effective and environmentally acceptable production.

SUMMARY OF THE INVENTION

It is therefore an object of the present invention to provide a method for fabricating a funnel, a tool for carrying out said method, and a funnel made of flat material, more particularly of plastic-coated paper, and a receptacle intended for a pulverulent and/or liquid medium and comprising a funnel disposed in a pouring or discharging region.

In particular, the object is achieved by a method for fabricating a funnel from a flat material, in which method a blank of flat material is shaped to a funnel-shaped sleeve comprising an outlet opening, an inlet opening, and an opening angle, and the funnel-shaped sleeve is swaged, at least over a portion thereof, to effect enlargement of the opening angle.

For the purposes of the present invention, the term "funnel-shaped sleeve" refers to a sleeve, the diameter of which diminishes in the axial direction from an inlet opening toward an outlet opening or vice versa. In the conventional use of a finished funnel, the inlet opening is larger than the outlet opening. For the purposes of this invention, the outlet opening therefore refers to that opening of the funnel-shaped sleeve that has the smaller diameter. The inlet opening refers to that second opening of the funnel-shaped sleeve that is opposite the outlet opening. In advantageous embodiments, the funnel-shaped sleeve has a substantially conical shape. Such a substantially axially symmetrical shape permits simple further processing. In other embodiments, provision is made for the sleeve and the funnel formed therefrom to have a rectangular basic shape. The shape of the sleeve is in principle arbitrary and is determined by the shape of the receptacle into which the funnel is to be inserted. It is possible to place a funnel in arbitrarily shaped cans.

In the fabrication of a funnel-shaped sleeve, for example, by means of a wrapping or rolling process, the maximum opening angle is limited by manufacturing considerations. Large opening angles can be achieved only when the overall height of the funnel is increased accordingly. By means of a method of swaging the sleeve, it is possible to create a funnel which has, at least in certain regions, a flatter, that is, a larger, opening angle and in which the ratio of diameter to height is thus increased. Thus, when the funnel is used in a receptacle, the usable space for a pulverulent or liquid medium in the receptacle is increased. In one embodiment, an opening angle of the sleeve is enlarged over the entire height thereof. In one embodiment, the opening angle of the undeformed sleeve is small, for example less than 10°. Preferably, however, the opening angles are greater than 10°.

According to one embodiment of the method of the invention, provision is made for constriction of the region adjoining the outlet opening by a swaging procedure such that a substantially cylindrical outlet region is achieved. This produces a funnel shape providing good flow conditions for a medium guided through the resulting funnel.

In advantageous embodiments, the sleeve is swaged by means of a tool comprising at least two components. According to one embodiment of the method of the invention, provision is made for fixing the funnel-shaped sleeve between two complementary tool components that are capable of moving relatively to each other in the axial direction of the funnel-shaped sleeve, and for swaging the sleeve in the axial direction by means of an advancing movement of at least one tool component, for the purpose of swaging the sleeve. Preferably, the tool components are in the form of a stationary die and a plug that can be moved relatively thereto. The outside contour of the die corresponds to the contour of the swaged sleeve. The plug is moved in the direction extending from the outlet opening toward the die. The funnel-shaped sleeve is thus pressed into a desired shape. The shape of the tools used can be such as correspond to the desired final shape of the peripheral surface of the funnel in the swaged region. If plastic-coated paper is used as the flat material, provision is made, in advantageous embodiments, for at least partial warming, more particularly heating, of at least one of the two tool components.

In a development of the invention, provision is made for at least one of the two tool components, preferably the plug, to have recesses, into which the flat material can flow during the swaging procedure. This prevents excess material from wrinkling up when the funnel-shaped sleeve is swaged or compressed.

According to a further embodiment of the method, provision is made for stiffening an edge of the outlet opening. The stiffening process reduces the risk of damage to the region of the outlet opening. For the purpose of stiffening, provision is made, in advantageous embodiments, for turning the flat material over at the outlet opening, more particularly inwardly toward the interior of the funnel-shaped sleeve, for example. With certain applications, it may alternatively be advantageous to turn the flat material over outwardly at the outlet opening. This is likewise possible. In doing so, the flat material undergoes deformation. For the purposes of the present invention, the deformed flat material is also referred to as flat material. Preferably, the method of turning the flat material over is carried out in at least two work steps. The turnover may also be accomplished in a single work step and the flat material, particularly paper, may be pressed through the opening itself by means of a plug. Shaping of the funnel-shaped sleeve by means of rolling or wrapping procedures does not always ensure that the outlet opening is circular. In the procedure for creating a turnover of the flat material in a number of steps, the outlet opening is therefore initially caused to assume a desired circular shape. For this purpose, in advantageous embodiments, a tool is used which comprises a plug that has a conical outside contour and that is placed in the outlet opening. The shape of the plug simplifies the insertion thereof into the outlet opening. In a further step, a final procedure for creating a turnover of the flat material is carried out, for which purpose a plug having a substantially circularly cylindrical outside contour is inserted into the pre-formed outlet opening. This plug determines the final shape of the outlet opening. In advantageous embodiments, the tool is likewise at least partially heated. Compression and also sealing of the outlet opening can alternatively be accomplished using a rotary tool, more particularly a rolling tool, In advantageous embodiments, the funnel-shaped sleeve is swaged following the procedure for stiffening the outlet opening, because in this way the complexity of the shapes of the required tools can be kept low.

In another advantageous embodiment, the procedure for creating a turnover of the flat material at the outlet is carried out, at least in part, together with the procedure for swaging the funnel-shaped sleeve, in a common work step. As a result, the overall number of work steps can be minimized. Minimization of the necessary work steps is also advantageous, inter alia, for matching the number of machining steps to the number of work stations in a manufacturing plant.

In an advantageous development of the method of the invention, recesses are provided at the edge forming the outlet opening of the funnel-shaped sleeve after the latter has been shaped, which recesses relieve stresses occurring when turning the flat material over. In one embodiment, the recesses are provided prior to shaping the funnel-shaped sleeve. For example, the recesses are provided when stamping out the blank of flat material. In other embodiments, the recesses are made in the wrapped or rolled sleeve. The recesses have a shape that is suitable or relieving stresses occurring when shaping the flat material. The recesses can extend away from the edge and have parallel side edges pointing in the direction of peripheral lines of the cone shape and have a circular base or the edge may alternatively be wavy. Thus it is possible to avoid cracks in the plastic coating of a plastic-coated paper used as the flat material. Such types of cracks result in an increase in the oxygen permeability of the paper and are deleterious, particularly when the funnel is used in the outlet of a receptacle.

Alternatively or additionally, provision is made, in advantageous embodiments of the method of the invention, to seal the outlet opening. This step likewise improves protection of the outlet opening from damage. In advantageous embodiments, the sealing procedure is carried out by means of a sealing mandrel and/or expanding sealing jaws.

Preferably, a connecting region is formed on the funnel in order to make it possible to insert the funnel fabricated by the method of the invention into a receptacle. In advantageous embodiments, the flat material is turned over, more particularly outwardly, in the region of an inlet opening for this purpose, so that a substantially cylindrical edge, more particularly a substantially cylindrical outside edge, is produced. By means of the outside edge produced in the region of the inlet opening, it is possible to join, more particularly glue, or seal, the funnel thus fabricated to a receptacle.

In advantageous embodiments, for the purpose of turning the flat material over in the region of the inlet opening, the funnel-shaped sleeve is secured between two complementary tool components capable of moving relatively to each other in the axial direction of the funnel-shaped sleeve and compressed to the desired shape. Alternatively, one of the tool components can be stationary. In some embodiments, the procedure for creating an edge turnover on the funnel-shaped sleeve in the region of the inlet opening is carried out as the last work step. In other embodiments, this procedure for creating an edge turnover on the funnel-shaped sleeve is carried out prior to the procedure for swaging the sleeve and/or stiffening the outlet opening. In advantageous embodiments, the flat material is shaped to a sleeve and is turned over in the region of the inlet opening over the entire periphery of the sleeve concurrently. For this purpose, in one embodiment, a plug is provided which has a conical outside contour and by means of which the flat material is turned over outwardly. In one embodiment, the procedure for further shaping the outside edge so that a cylindrical outside contour is achieved is carried out by means of a second plug. In advantageous embodiments, the first plug additionally has an annular groove, the shape of which is configured so as to match the cylindrical outside contour and the opening angle of the sleeve to be created. As a result, it is possible to shape the edge by means of a tool which is advanced accordingly. Alternatively, the creation of an edge turnover at the inlet opening or the outlet opening is carried out in only one step by means of a flat plug whose plug surface is at right angles to the direction of advance. In advantageous embodiments, the tool components are heated. In other embodiments, shaping is carried out at room temperature.

In one embodiment, at least one of the tool components performs a rotary movement about the longitudinal axis of the funnel-shaped sleeve.

In one advantageous embodiment, provision is made for the use of a pre-fabricated ring segment-shaped blank of flat material that is wrapped around a wrapping mandrel for the purpose of shaping the funnel-shaped sleeve and is joined, more particularly sealed, at the ends thereof. Preferably, the ends of the blank overlap each other following the wrapping or rolling procedure. The ends are joined together, for example adhesively and/or by sealing.

The object of the invention is also achieved by means of a tool for carrying out the method of the invention.

The object of the invention is further achieved by means of a funnel made of flat material, more particularly plastic-coated paper, the funnel comprising a substantially cylindrical outlet region. Provision is made, in advantageous embodiments, for the peripheral region of the funnel to exhibit a discontinuous change in diameter. The funnel is configured so as to be flatter than conventional funnels and it has an optimized ratio of diameter to height.

Finally, the object of the invention is achieved by a receptacle that is intended for pulverulent and/or liquid media and that comprises a funnel of the invention disposed in the interior of the receptacle.

BRIEF DESCRIPTION OF THE DRAWINGS

Additional advantages of the invention are revealed in the subordinate claims and in the following description of exemplary embodiments of the invention illustrated diagrammatically in the drawings. The same reference numerals or characters are used for identical or similar components in the drawings. Features described or illustrated as part of an exemplary embodiment can also be used in another exemplary embodiment in order to obtain a further embodiment of the invention.

In the drawings:

FIG. 25 illustrates a work step for creating an edge turnover on an inlet opening of the funnel-shaped sleeve by the method of the invention according to the third embodiment in a first state, and.

FIG. 26 illustrates the work step illustrated in FIG. 25 in a second state.

FIG. 29 illustrates a work step for sealing the outlet opening in the method of the invention according to the fourth embodiment.

FIG. 34 is a sectional view of a receptacle of the invention with a fitted funnel as shown in FIG. 33, and.

DETAILED DESCRIPTION

Figure 11:
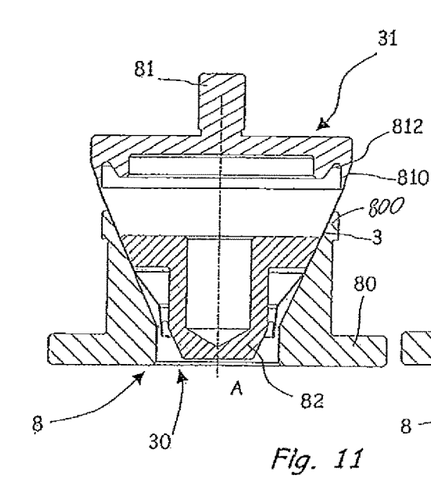
FIG. 11 shows a work step for creating an edge turnover on an inlet opening of the funnel-shaped sleeve by a method of the invention according to the first embodiment in a first state.
Figure 12:
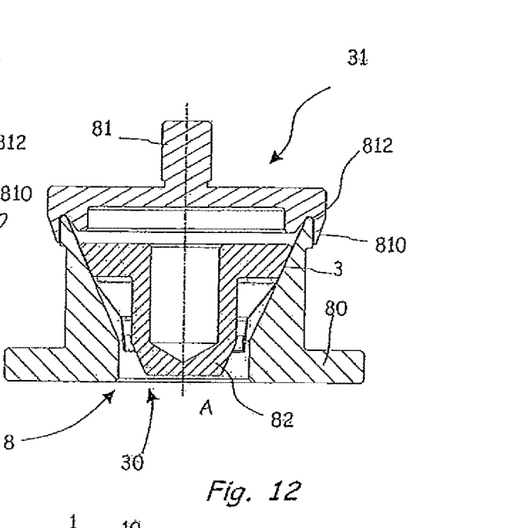
FIG. 12 shows the work step illustrated in FIG. 11 in a second state.
Figure 13:
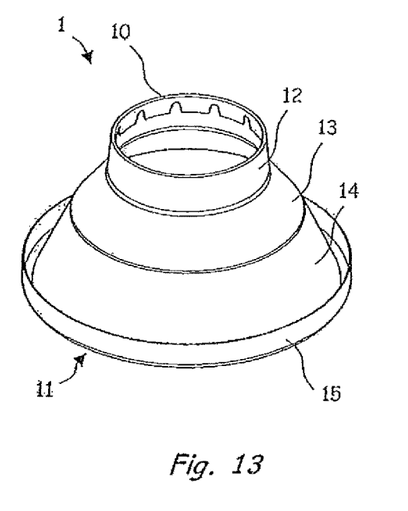
FIG. 13 shows a finished funnel shape in a first embodiment.
Figure 14:
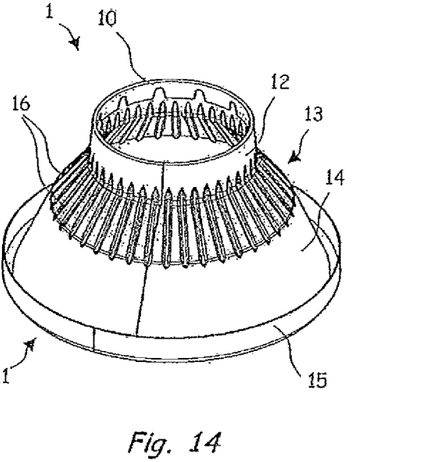
FIG. 14 shows a finished funnel shape in a second embodiment.

FIGS. 1 to 12 diagrammatically illustrate various steps and intermediate products for fabricating a funnel 1 of the invention from plastic-coated paper, as shown in its finished form in FIGS. 13 and 14.

The funnel 1 shown in FIGS. 13 and 14 comprises an outlet opening 10 and an inlet opening 11. An outlet region 12 that adjoins the outlet opening 10 has a substantially cylindrical shape. A peripheral region 13, 14 of the funnel 1 has two different opening angles, the opening angle of the region 13 adjoining the outlet region 12 being larger than the opening angle of the region 14 adjoining the inlet opening 11. The inlet opening 11 has a cylindrical outside edge 15 that serves for establishing a connection between the funnel and a receptacle (not illustrated) having a complementary cylindrical inner contour. In the embodiment shown in FIG. 14, ribs 16 protruding in the radial direction are provided in the peripheral region 13.

Figure 1:
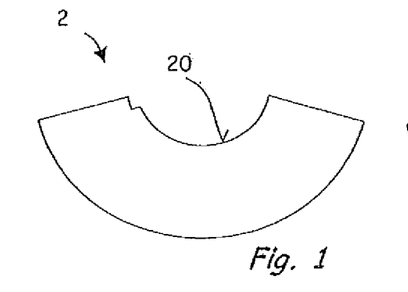
FIG. 1 shows a ring segment-shaped blank of flat material for fabricating a funnel.
Figure 2:
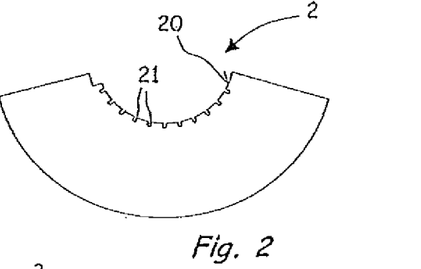
FIG. 2 shows a ring segment-shaped blank of flat material for producing a funnel that is similar to that shown in FIG. 1 and comprises recesses at one edge thereof.
Figure 3:
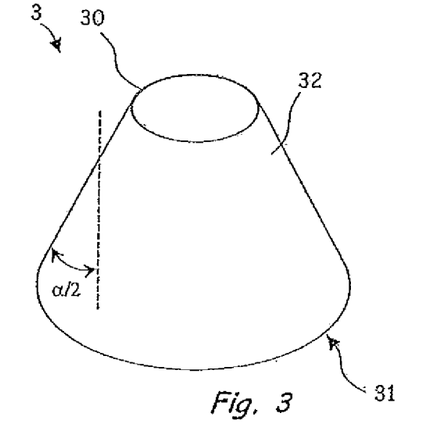
FIG. 3 shows a funnel-shaped sleeve formed from the ring segment-shaped blank of flat material shown in FIG. 1.
Figure 4:
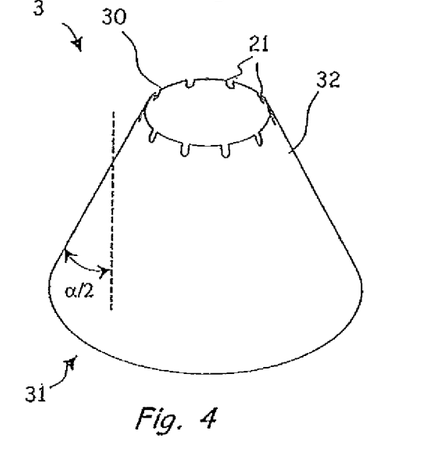
FIG. 4 shows a funnel-shaped sleeve formed from the ring segment-shaped blank of flat material shown in FIG. 2.

According to the method illustrated in FIGS. 1 to 12, a funnel-shaped sleeve 3 shown in FIGS. 3 and 4 is first produced from a prefabricated blank of flat material 2 which is in the form of a ring segment, as illustrated diagrammatically in FIGS. 1 and 2. FIGS. 1 and 2 show alternative embodiments of a blank of flat material 2, the blank of flat material 2 in the exemplary embodiment shown in FIG. 2 comprising, at one edge thereof, recesses 21, the purpose of which is described below.

Figure 5:
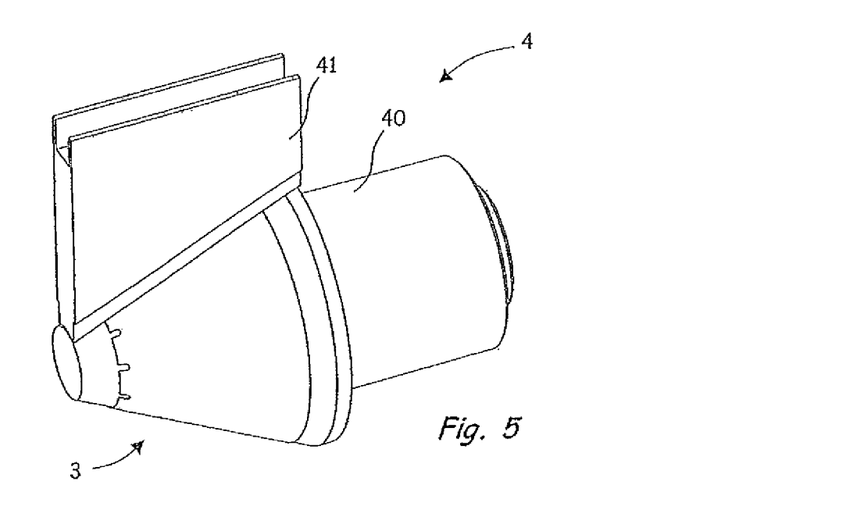
FIG. 5 illustrates a procedure for sealing the ends of the ring segment-shaped blank of flat material shown in FIG. 1 after it has been shaped to form to a funnel-shaped sleeve.

As illustrated diagrammatically in FIG. 5, a shaping procedure is carried out in advantageous embodiments, by means of a tool 4 comprising a wrapping mandrel 40. The blank of flat material 2 shown in FIG. 1 or 2 is placed around the wrapping mandrel 40 for the purpose of shaping the funnel-shaped sleeve 3. Preferably, the blank of flat material 2 is of plastic-coated paper. The blank of flat material 2 may be caused to better assume the shape of the wrapping mandrel 40 by means of an additional optional thermal treatment. As further illustrated diagrammatically in FIG. 5, the overlapping ends of the blank of flat material 2 shown in FIG. 1 are sealed, glued, or joined together in some other way, by means of a tool 41 after the blank has been rolled or wrapped onto the mandrel. By rolling and joining their ends, the funnel-shaped sleeves 3 illustrated diagrammatically in FIGS. 3 and 4 are shaped to have an inlet opening 31, an outlet opening 30 and an opening angle α, half the opening angle α/2 being drawn in FIGS. 3 and 4. The outlet opening 30 has a smaller diameter than the inlet opening 31.

FIGS. 6 to 12 illustrate a first embodiment of the actual procedure for producing a funnel 1 of the invention.

Firstly, the outlet opening 30 of the sleeve-shaped funnel 3 is stiffened. In the embodiment shown, in order to stiffen the outlet opening 30, the edge 20 of the flat material shown in FIGS. 1 and 2 is turned over and sealed following the shaping procedure for the funnel-shaped sleeve 3.

Figure 6:
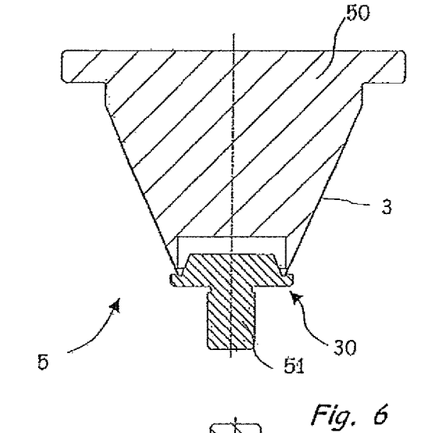
FIG. 6 shows a first work step for stiffening an outlet opening in a method of the invention according to a first embodiment.
Figure 7:
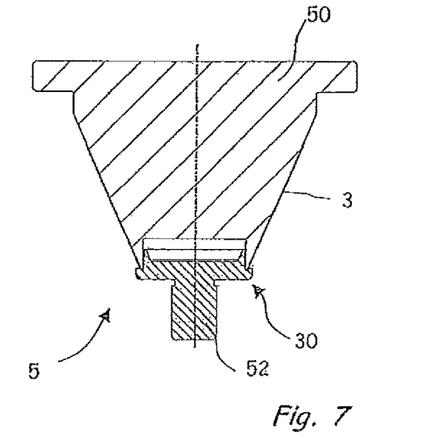
FIG. 7 shows a second work step for stiffening an outlet opening in a method of the invention according to the first embodiment.

FIGS. 6 and 7 diagrammatically illustrate a procedure for creating an edge turnover on the flat material in the region of the outlet opening 30 by means of a tool 5 comprising a die 50 and two plugs 51, 52. In the exemplary embodiment shown, the edge 20 is turned over in the direction of the interior of the funnel-shaped sleeve 3. The procedure for creating an edge turnover on the flat material is carried out in two stages, for which purpose the two plugs 51, 52 are employed in succession. The funnel-shaped sleeve is placed on the stationary die 50 and shaped by means of the plugs 51, 52.

Shaping of the funnel-shaped sleeve 3 by means of rolling or wrapping does not always ensure that the outlet opening 30 is circular. In the exemplary embodiment shown, the outlet opening is therefore initially forced into a circular shape. For this purpose, the first plug 51 shown in FIG. 6 has a conical region, which is inserted into the outlet opening 30. Thus the plug 51 is self-centering.

The second plug 52 shown in FIG. 7 has a substantially circularly cylindrical outside contour and serves to determine the final shape of the outlet opening 30.

The recesses 21 shown in FIG. 2 are advantageous for preventing the blank of flat material 2 shown in FIGS. 1 and 2 from tearing at the edge 20 when being turned over, as shown in FIGS. 6 and 7. These recesses 21 are shaped so as to relieve the stresses occurring in the blank of flat material when its edge is turned over.

Figure 8:
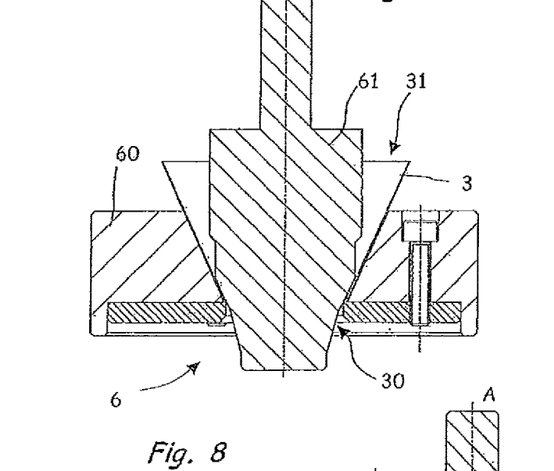
FIG. 8 shows a work step for sealing the outlet opening in a method of the invention according to the first embodiment.
Figure 9:
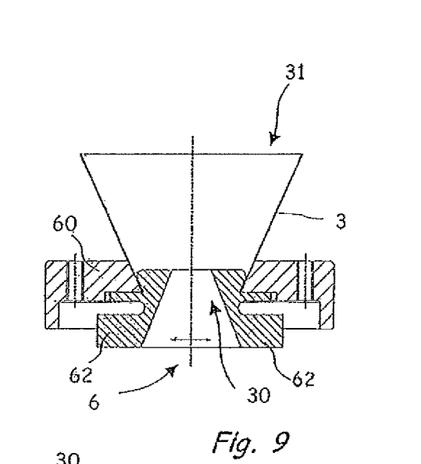
FIG. 9 shows an alternative work step for sealing the outlet opening shown in FIG. 8.

In a subsequent step of the method according to the first embodiment, the flat material is sealed at the outlet opening. FIGS. 8 and 9 diagrammatically show possible alternative procedures for sealing the outlet opening 30 by means of a tool 6.

The tool 6 shown in FIG. 8 comprises a die 60 and a sealing mandrel 61 inserted into the funnel-shaped sleeve 3 from the direction of the inlet opening 31. The sealing mandrel 61 and the die 60 have conical surfaces, which are complementary to each other and between which the outlet opening 30 is sealed.

In the alternative embodiment shown in FIG. 9, there is provided a tool 6 that comprises sealing jaws 62 that are movable relatively to each other in the radial direction. A plurality of sealing jaws 62 is provided, and these are distributed at intervals along the circumference of the tool 6. The sealing procedure is effected by means of the sealing jaws 62 in at least two steps, during which the sealing jaws 62 are displaced in the peripheral direction such that the outlet opening is sealed over its entire circumference.

Figure 10:
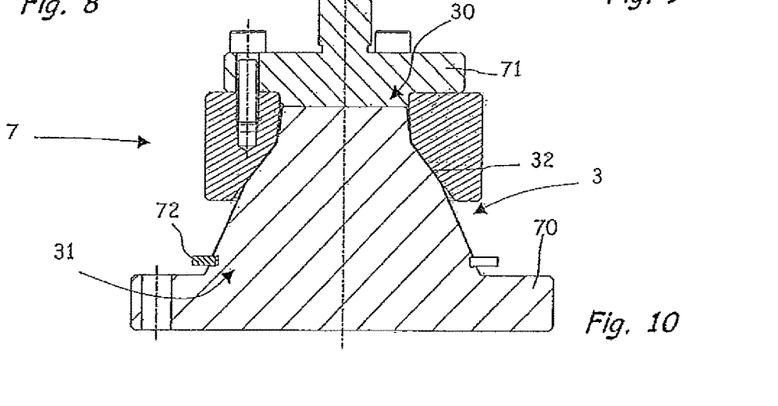
FIG. 10 shows a work step for swaging the funnel-shaped sleeve by a method of the invention according to the first embodiment.

In a subsequent method step illustrated in FIG. 10, the funnel-shaped sleeve 3 is swaged in a region 32 adjoining the outlet opening 30. A tool 7 comprising components in the form of a die 70 and a plug 71 is provided for this purpose. The funnel-shaped sleeve 3 is secured between the die 70 and the plug 71, and the plug is advanced in the axial direction A for the purpose of swaging the funnel-shaped sleeve. Furthermore, a stop member 72 is provided for securing the funnel-shaped sleeve between the die and the plug.

An outside contour of the die 70 corresponds to the desired contour of the swaged sleeve 3. The plug 71 is moved from the direction of the outlet opening 30 toward the die 70. Thus the funnel-shaped sleeve 3 is pressed into the desired shape. The shape of the tool 7 used can be such as to correspond to the desired final shape of the peripheral surface 13 of the funnel 1 as shown in FIGS. 13, 14 in the swaged region 32. If plastic-coated paper is used as the flat material, provision is made, in advantageous embodiments, for at least one of the two tool components 70, 71 to be heated.

Preferably, recesses (not visible in the figure) are provided at least on the tool component disposed on the exterior of the funnel-shaped sleeve 3, in this case the plug 71, into which recesses the excess material can flow during the swaging and compressing procedures. This causes the outside contour of the funnel 1 in the region 13 to have ribs 16, as shown in FIG. 14.

An outside edge 15 of the funnel 1 shown in FIGS. 13 and 14 is produced in a final work step of the method according to the first embodiment. When the funnel 1 is used, this outside edge 15 serves, for example, to position the funnel 1 in a receptacle, more particularly in a pre-fabricated sleeve or a can, and to secure it therein.

FIGS. 11 and 12 show two states when creating an edge turnover on the funnel-shaped sleeve 3 in the region of the inlet opening 31. A tool 8 for creating an edge turnover on the outside edge comprises a die 80, a plug 81, and a mandrel 82 disposed in the interior of the funnel-shaped sleeve 3, which prevent further deformation of regions of the sleeve 3 that have already undergone deformation. The funnel-shaped sleeve 3 is secured between the die 80 and the mandrel 82. The plug 81 is capable of being moved relatively thereto in the axial direction A.

The plug 81 has a conical outside contour 810 and it is first inserted into the inlet opening 31, as shown in FIG. 11. Thus the flat material in the region of the inlet opening 31 is deformed outwardly. The plug 81 further has an annular groove 812 that determines the final shape of the inlet opening 31. The shape of the annular groove 812 is configured so as to match the cylindrical outside contour and the opening angle of the sleeve 3.

The die 80 comprises a projection 800 that is configured so as to be complementary to the annular groove 812 and moves into the annular groove 812 when the distance between the die 80 and the plug 81 is less than a predetermined minimum. In doing so, the material located between the projection 800 and the annular groove 812 is bent over. Thus the substantially circularly cylindrical outside edge 15 shown in FIGS. 13 and 14 is produced by means of a continued advancing movement of the plug.

In advantageous embodiments, the plug 81 is moved only in the axial direction A. Furthermore, an additional rotary movement of the plug 81 is feasible. In advantageous embodiments, the tool components 80, 81, 82 are heated. In other embodiments, shaping is carried out at room temperature.

FIGS. 15 to 21 show an alternative procedure for shaping the funnel-shaped sleeve 3 shown in FIG. 4 to form a funnel 1 as shown in FIG. 13 or 14. In the procedure illustrated in FIGS. 15 to 21, the material in the region of the inlet opening 31 is first turned over. In the subsequent work steps, the outlet opening 30 is processed, and the funnel-shaped sleeve 3 is swaged. The tools used for this procedure are similar or identical to those employed for the procedure illustrated in FIGS. 6 to 12, and the same reference numerals or characters are used for identical or similar components. Components already described above are not explained in detail below.

Figure 15:
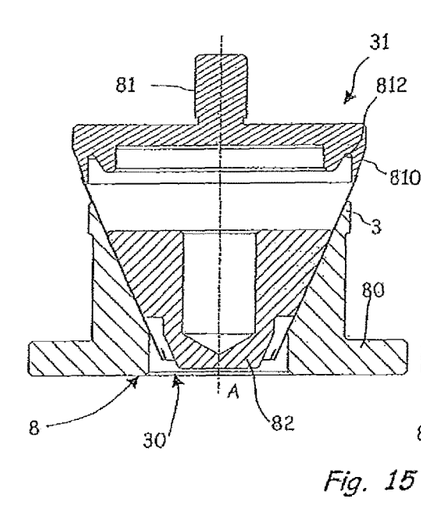
FIG. 15 illustrates a work step for creating an edge turnover on an inlet opening of the funnel-shaped sleeve by a method of the invention according to a second embodiment in a first state.
Figure 16:
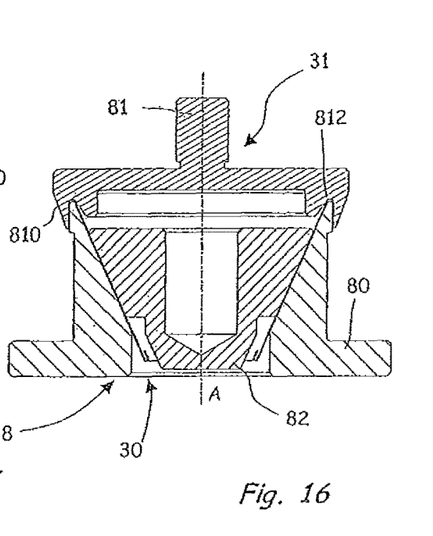
FIG. 16 illustrates the work step shown in FIG. 15 in a second state.

FIGS. 15 and 16 diagrammatically show two states when creating an edge turnover on the flat material in the region of the inlet opening 31. At the start of this procedure, the peripheral surface of the funnel-shaped sleeve 3, as shown in FIG. 15, has not yet been processed further. The tool 8 for creating an edge turnover on the flat material in the region of the inlet opening 31 corresponds substantially to the tool 8 shown in FIGS. 11 and 12. The tool 8 comprises a die 80, a plug 81, and a mandrel 82, the plug 81 having been provided with a conical outside contour 810 and an annular groove 812. The shape of the die 80 and of the mandrel 82 is configured so as to match that of the yet to be shaped funnel-shaped sleeve 3. In order to avoid repetition, reference is made to statements made above, more particularly to the description of FIGS. 11 and 12, for a description of the mode of operation of the tool 8.

Figure 17:
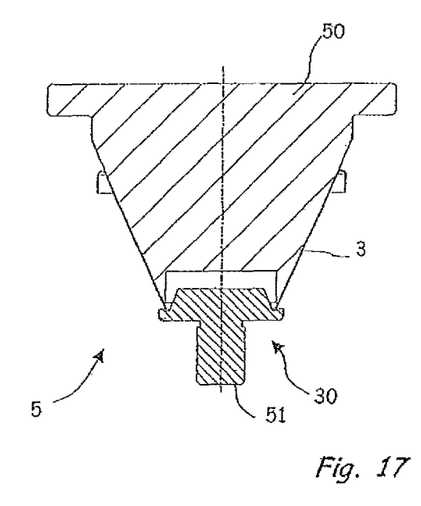
FIG. 17 illustrates a first work step for stiffening an outlet opening by a method of the invention according to a second embodiment.
Figure 18:
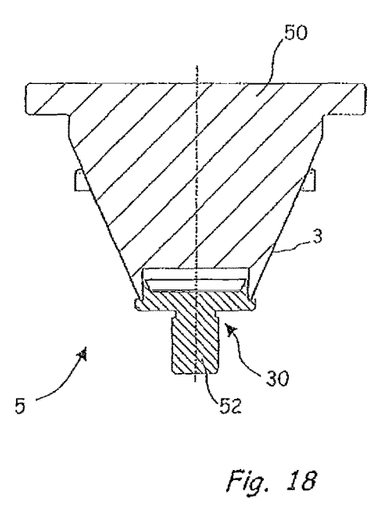
FIG. 18 illustrates a second work step for stiffening an outlet opening by a method of the invention according to the second embodiment.

FIGS. 17 and 18 illustrate a procedure for creating an edge turnover on the flat material in the region of the outlet opening 30 for the purpose of stiffening the same. The procedure for creating an edge turnover on the flat material is carried out by means of a tool 5 that is shown in FIGS. 6 and 7 and comprises a first plug 51 having a conical outside contour and a second plug 52 which has a substantially cylindrical outside contour and which is advanced in a second work step. Reference is made to FIGS. 6 and 7 above for a detailed description.

Figure 19:
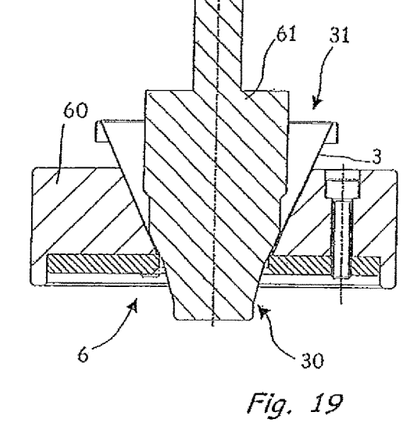
FIG. 19 illustrates a work step for sealing the outlet opening by a method of the invention according to the second embodiment.
Figure 20:
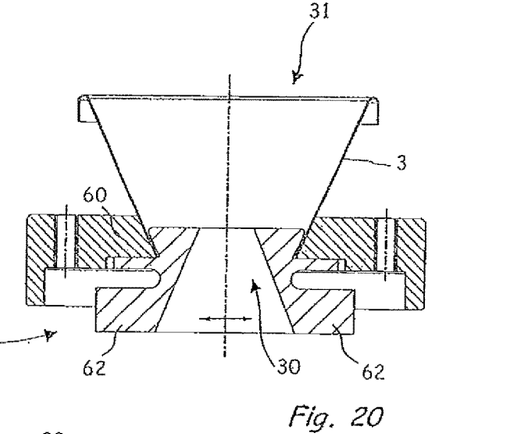
FIG. 20 illustrates an alternative work step for sealing the outlet opening shown in FIG. 19.

Subsequently, an edge in the region of the outlet opening 30 is sealed. FIGS. 19 and 20 show two alternative embodiments of a tool 6 used for sealing purposes. Reference is made to the description of FIGS. 8 and 9 above for the description of the tool 6.

Figure 21:
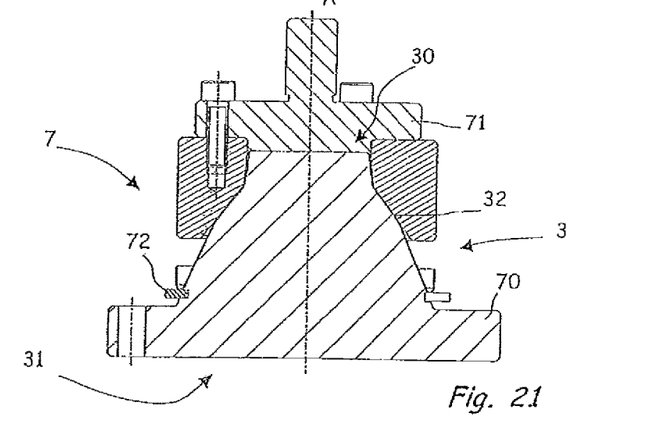
FIG. 21 illustrates a work step for swaging the funnel-shaped sleeve by a method of the invention according to the second embodiment.

Finally, FIG. 21 shows the procedure for swaging the funnel-shaped sleeve 3 so as to enlarge the opening angle of a portion 32 of the peripheral surface. The distance between the plug 71 and the stop member 72 is shorter than in the case of the tool 7 shown in FIG. 10. For the remaining description of this method step, reference is made to the description of FIG. 10. Thus the completion of the swaging procedure illustrated in FIG. 21 produces the funnel shown in FIG. 13 or 14, in which ribs 16 are optionally formed in the region 32 that undergoes deformation during the swaging process shown in FIG. 21.

FIGS. 22 to 26 show a third embodiment of a method of the invention for shaping a funnel-shaped sleeve 3 shown in FIG. 4 to a funnel 1, as shown in FIGS. 13 and 14.

Figure 22:
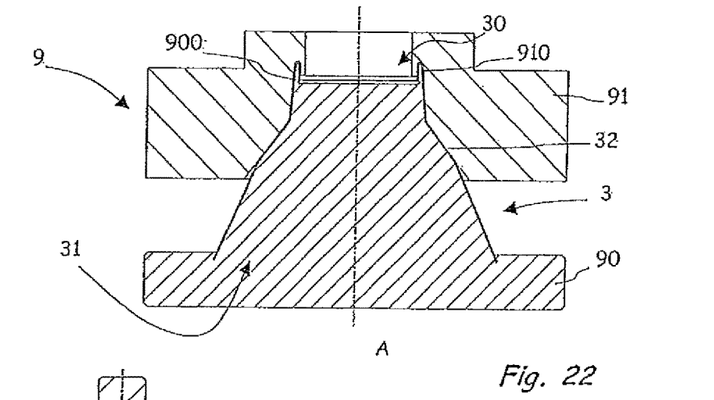
FIG. 22 illustrates a work step for swaging the funnel-shaped sleeve by a method of the invention according to a third embodiment.

In a work station shown in FIG. 22, the procedure for swaging a portion 32 of the peripheral surface for the purpose of expanding an opening angle of the funnel-shaped sleeve 3 and, at the same time, of stiffening the outlet opening 30 by creating an edge turnover on the flat material in the appropriate region are carried out by a tool 9 comprising a die 90 and a plug 91. Before processing the funnel-shaped sleeve 3 by means of the tool 9, shown in FIG. 22, provision is made, in one embodiment, to pre-shape an edge of the outlet opening 30 by means of a tool 5 comprising the plug 51 shown in FIG. 6. This ensures that the region of the outlet opening 30 has a circular opening, into which the tool component 91 can be inserted. The tool component 91 has an annular groove 910 that cooperates with a complementary projection 900 on the die 90, and the flat material in the region of the outlet opening 30 is turned over between the annular groove and the projection.

The outlet opening 30 is sealed in a subsequent work step.

Figure 23:
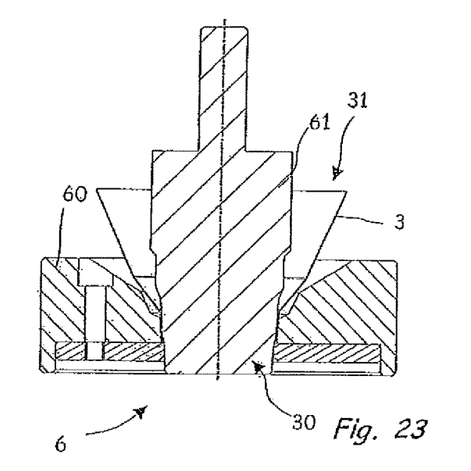
FIG. 23 illustrates a work step for sealing the outlet opening by a method of the invention according to the third embodiment.
Figure 24:
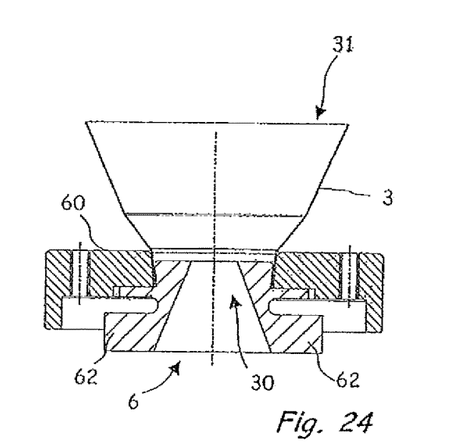
FIG. 24 illustrates an alternative work step for sealing the outlet opening shown in FIG. 23.
Figures 25, 26:
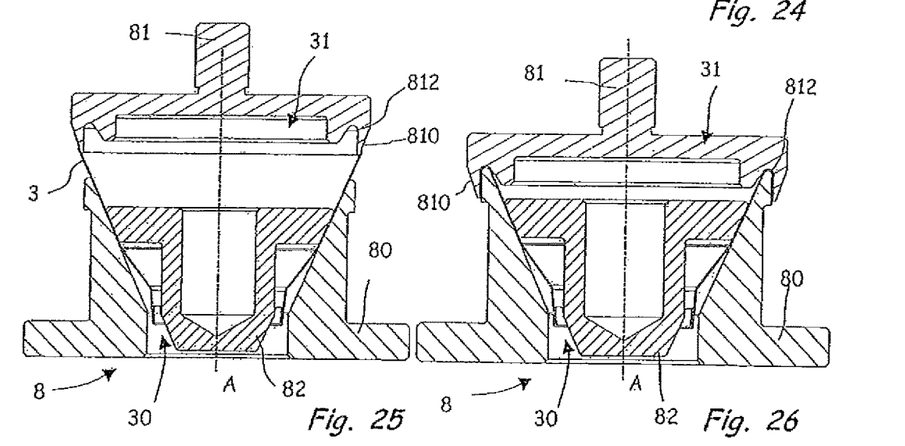

FIGS. 23 and 24 each show a tool 6 for sealing the outlet opening. The tool 6 corresponds to the tool 6 shown in FIGS. 8 and 9, to which reference is made for a detailed description of this step.

In a final step for the fabrication of the funnel 1, as shown in FIGS. 13 and 14, the material in the region of the inlet opening 31 is turned over by means of a tool 8 comprising a die 80, a plug 81, and a mandrel 82. Before being processed, the sleeve 3 is converted by the tool 8 to a shape that corresponds to the shape prior to processing of the sleeve shown in FIGS. 11 and 12. Therefore, processing of the sleeve 3 is carried out as described with reference to FIGS. 11 and 12.

The method of the invention makes it possible to fabricate funnels of different shapes that can be distinguished from each other based on the size of the opening angle, on the number and/or position of locations at which an opening angle varies, and on the diameter and/or shape of the ribs 16 shown in FIG. 14. At all events, a funnel is achieved that has an optimized ratio of diameter to height and can thus be placed in the interior of a receptacle in a space-saving manner.

All tools used for shaping the flat material, more particularly plastic-coated paper, are configured so as to be heatable in advantageous embodiments. The application of heat during processing reduces the tendency of the flat material to wrinkle or tear. In some embodiments, provision is made for intermediate cooling of the flat material between the individual work steps.

Referring to FIGS. 27 to 35, a fourth embodiment of the method of the invention and also of a funnel produced by the method of the invention, a receptacle containing such a funnel, and also the tools for carrying out the method are described.

Figure 27:
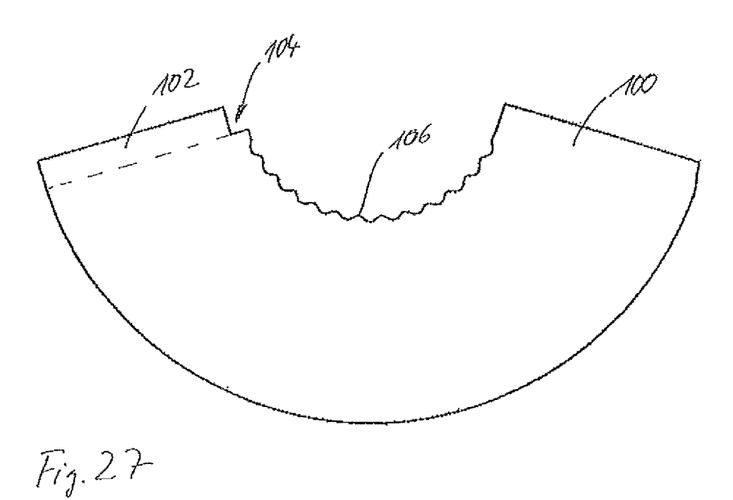
FIG. 27 shows an annular segment-shaped blank of flat material for the production of a funnel and having recesses along one edge.

FIG. 27 shows a blank of flat material 100 in the form of a ring segment. The blank of flat material 100 is wrapped around a cone-shaped mandrel, cf. FIG. 5, to form a sleeve having the shape of a truncated cone and is then sealed or glued in the region of an overlap 102 The region of the overlap is provided with a cutout 104 at its top edge of smaller diameter, as shown at the top of FIG. 27, such that in the region of said cutout 104 only a single thickness of material is present after the flat material has been glued to form a sleeve having the shape of a truncated cone. The cutout is rectangular in shape and is disposed at the corner between the turned-over edge of smaller radius and the straight side edge of the annular segment-shaped blank of flat material 100. This cutout facilitates the creation of the edge turnover at the outlet opening to be described below. The top edge 106 of the blank of flat material 100 shown in FIG. 27 and having the smaller radius is of a wavy design, in order to obviate the formation of cracks when the edge turnover is created at the outlet opening.

The individual steps for the production of a funnel from the blank of flat material 100 are as described above and include the provision of the blank of flat material 100 and shaping of the blank of flat material 100 on a conical mandrel to form a sleeve, and sealing or gluing the same in the region of an overlap 102.

Figure 28:
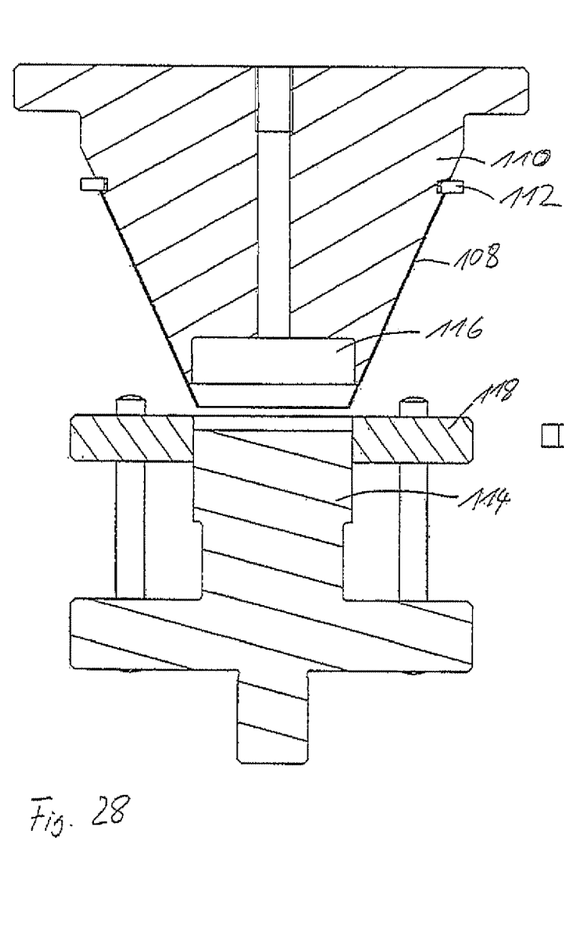
FIG. 28 illustrates a first work step for stiffening an outlet opening in a method of the invention according to a fourth embodiment.

There follows a description of the creation of an edge turnover at the outlet opening, cf. FIG. 28. The turnover at the outlet opening is then heated and the turnover at the outlet opening is sealed, cf. FIG. 29. Sealing of the turnover can be effected in two steps using a rotary tool or by means of a displaceable mandrel, in which case the mandrel is turned through 45 degrees between the two steps.

Figure 30:
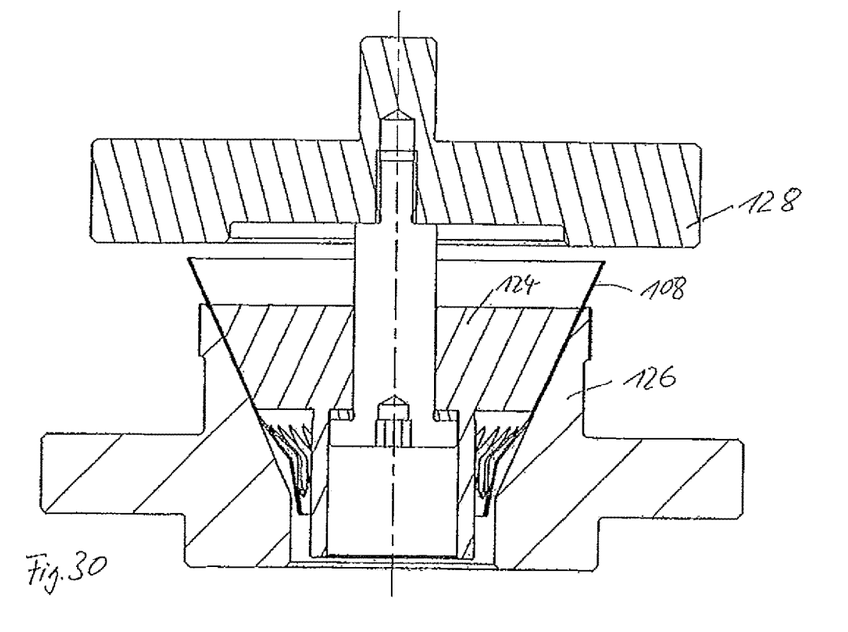
FIG. 30 illustrates a work step for the creation of an edge turnover at the inlet opening of the funnel-shaped sleeve in the method of the invention according to the fourth embodiment in a first state.
Figure 31:
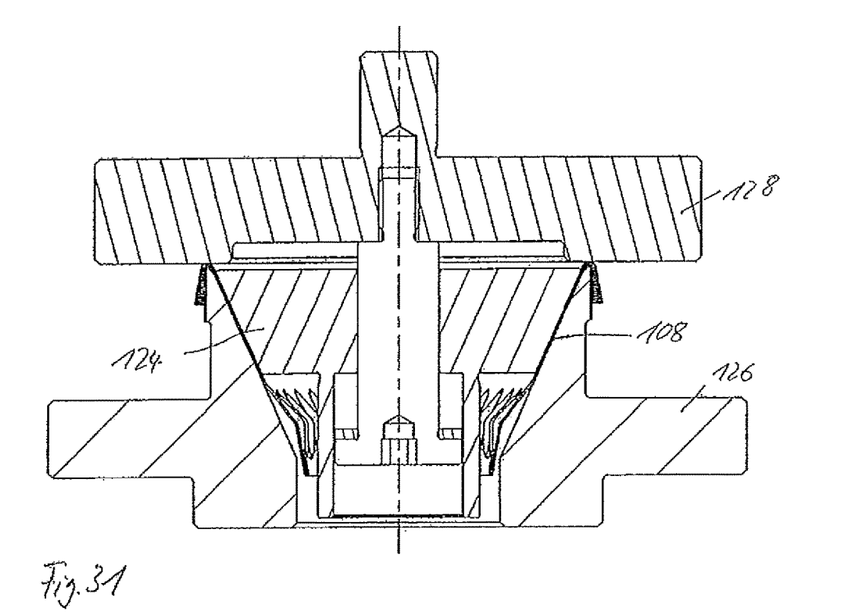
FIG. 31 illustrates the work step shown in FIG. 30 for turning over an inlet opening of the funnel-shaped sleeve in a second state.

There follows the creation of the turnover of the inlet opening by means of a flat plate-like plug, cf. FIGS. 30 and 31. The turnover is then post-shaped by means of an embossing ring and the embossing ring presses grooves into the turned-over edge by which means an irregular curve of the turned-over edge is avoided The embossing ring is divided into three parts to make it possible to open the same.

Subsequently or previously, constricting or embossing of the funnel shape is carried out, as already described with reference to FIGS. 10 and 21 and 22.

Figure 33:
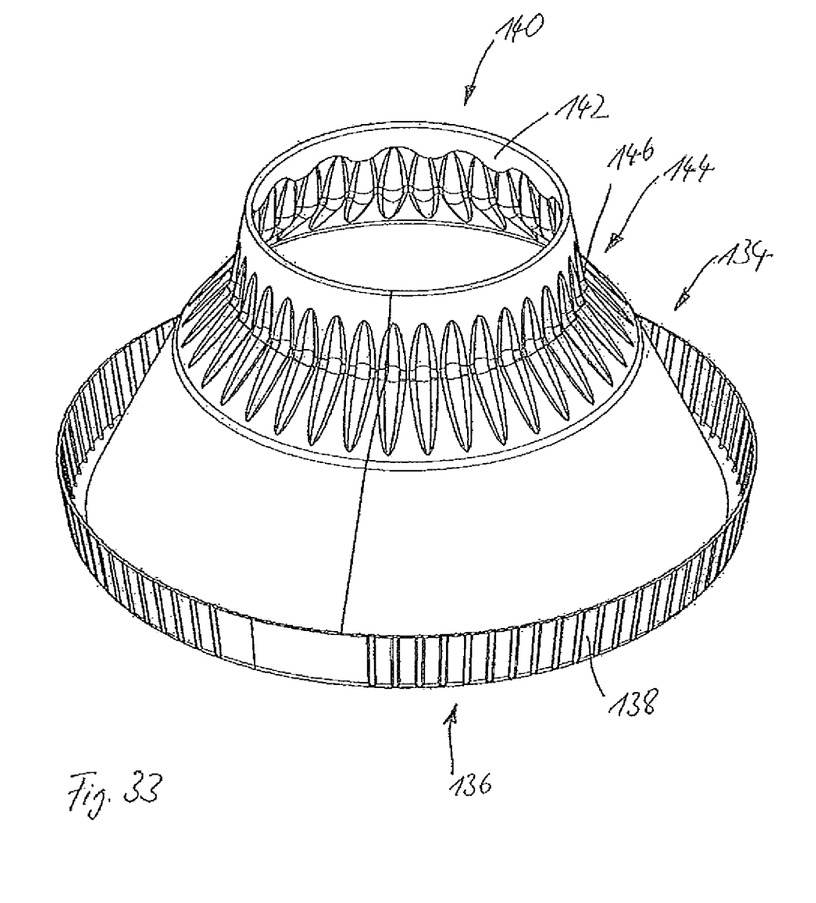
FIG. 33 shows a completed funnel according to the fourth embodiment of the invention.
Figure 34:
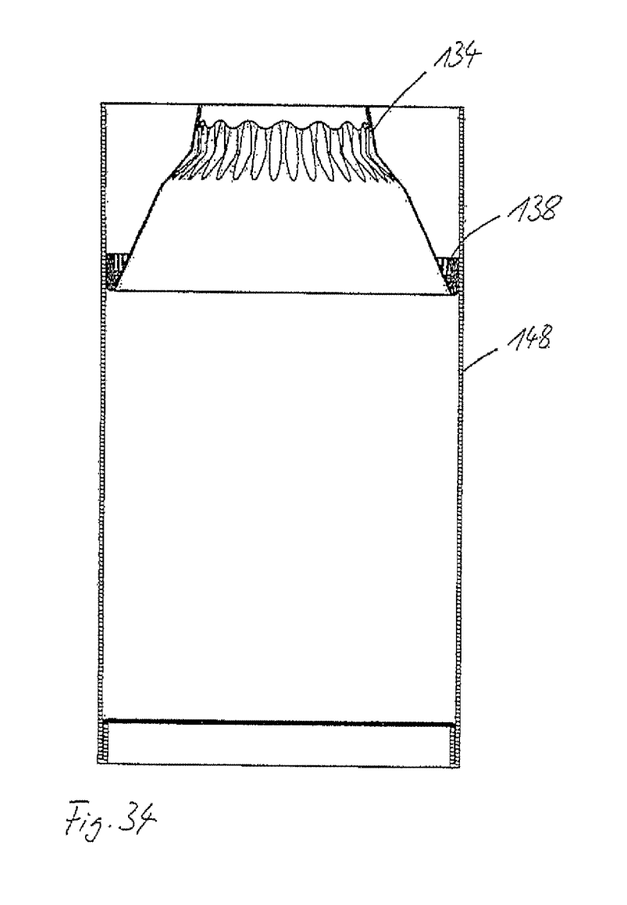
Figure 35:
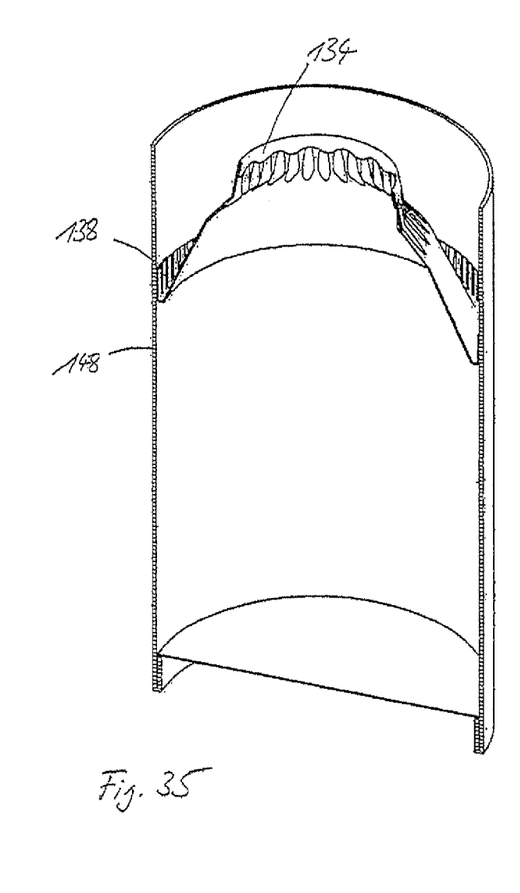
FIG. 35 shows the receptacle shown in the FIG. 34 in a sectional view taken obliquely from above.

The removal of the finished funnel can then take place, cf. FIG. 33 The finished funnel can then be placed in a receptacle, cf. FIG. 34 and FIG. 35, and, for example, be sealed or glued to the inside wall of the receptacle.

The work steps: shaping the inlet opening and shaping the outlet opening and forming the funnel angle by embossing/constricting the material, can be carried out in any order.

According to FIG. 28, the sleeve 108 produced from the blank of flat material 100 and having the shape of a truncated cone is positioned on a mandrel 110 having the shape of a truncated cone The sleeve 108 rests with its large-radius edge against stop members 112 at the perimeter of the mandrel 110. Due to the conical form of the mandrel 110 and the sleeve 108 the stop members may be omitted. The region of the small-radius outlet opening extends beyond the mandrel 110, and this edge of the outlet opening is turned over by means of a plug 114. The turnover is forced into a cylindrical recess 116 in the mandrel 110. The plug 114 has a slightly larger diameter than the small-diameter end of the sleeve 108. First of all, a flat plate 118 in which the plug 114 is guided is advanced toward the bottom edge of the sleeve shown in FIG. 28, such that this is thus approximately parallel to the plate 118. The plug 114 is then advanced toward the mandrel 110 and moved into the recess 116, by which means the edge of the outlet opening is simultaneously turned over. The plate 118 and the plug 114 may also be arranged in separate stations. The plate 118 may then be flat and without any through hole. Alternatively, the turnover may be performed in a single work step and exclusively be means of the plug 114. In this case, the plug 114 is a little wider than shown in FIG. 28. The cylindrical recess 116 is adapted to the dimensions of the plug 114 and the edge of the outlet opening is turned over by a movement of the plug 114 into the recess 116.

The illustration shown in FIG. 29 demonstrates the procedure of sealing the turnover on the outlet opening to the sleeve 108 To this end, there is provided a pressure roller 120, which applies pressure from inside against the edge turnover on the outlet opening of the sleeve 108 and rolls along its internal perimeter Since the turnover on the outlet opening has been previously, or is simultaneously, heated, the sealable coatings on the turnover and the interior surface of the sleeve bond together. During the movement of the pressure roller 120, the turned-over region of the sleeve 108 is positioned in a cavity 122.

The illustration provided in FIG. 30 shows the sleeve 108 while constricting and embossing of the funnel shape has already been carried out as shown in FIG. 10 or FIG. 20 and FIG. 21 The sleeve 108 is now held by means of an inside plug 124 and an outside die 126 such that only an edge of the inlet opening intended to be turned over projects beyond the plug 124 and the cavity 126. A plug 126 having a flat plug surface is now moved toward this projecting edge. The plug 126 causes the edge at the inlet opening to turn over, cf. FIG. 31, and to assume the state shown in FIG. 31. Turning the edge of the inlet opening can take place in a single step by simply moving the plug 126 against the free edge of the sleeve 108.

Figure 32:
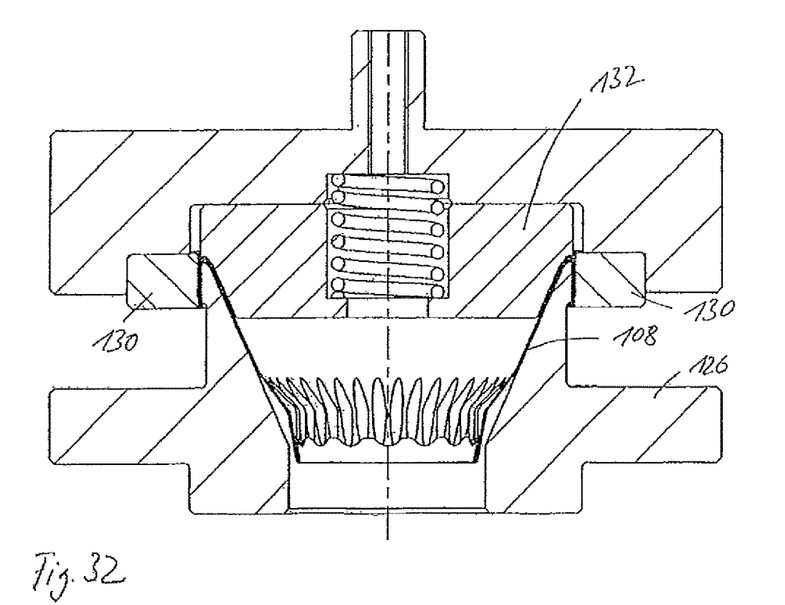
FIG. 32 illustrates the procedure of pressing grooves into the edge turnover at the inlet opening following on the work step illustrated in FIG. 31.

Following the turnover of the edge, grooves are then impressed into the turned-over edge of the sleeve 108, as illustrated in FIG. 32 These grooves prevent the turned-over edge from assuming a shape deviating from the circular shape or from a given shape.

Embossing the grooves is effected by means of an embossing ring 130, on the internal perimeter of which the groove arrangement to be impressed is provided The embossing ring 130 is circumferentially divided into, say, three parts, by which means it can be opened or placed over the turned-over edge of the sleeve 108. While the grooves are being impressed by means of the embossing ring 130, the sleeve 108 is held in the cavity 126 from the inside by means of a plug 132.

Following the impression of the grooves into the sleeve 108, the funnel 134 is complete, as may be seen from FIG. 33. In the region of its inlet opening 136, the funnel 134 displays the turned-over edge 138 provided with the grooves. At its outlet opening 140, the funnel 134 is provided with a turned-over edge 142. A center region 144 of the funnel is constricted and embossed for achieving the funnel shape. By means of the constriction, the typical funnel shape is achieved, and by means of the embossment, grooves 146 are formed which accommodate the material escaping during constriction to prevent the funnel 134 from deviating from circularity or from a given shape and to prevent the general formation of irregular waves in the material.

The finished funnel 134 is then pushed into a receptacle 148, cf. FIG. 34 and FIG. 35. The receptacle 148 in the illustrated embodiment is of a circularly cylindrical shape and is provided with a reversed pot-type base. The funnel 134 can then be placed via its turned-over edge 138 against the interior surface of the cylindrical wall of the receptacle 148 and, for example, sealed thereto.

The receptacle 148 can by this means be emptied in a convenient manner via the funnel 134. The receptacle 148 can, in the empty state, be first of all filled via the outlet opening of the funnel 134, as shown at the top of FIG. 34, and the outlet opening can then be provided with, say, closure means, which are then, for example, sealed thereto. Following removal of the closure means, the receptacle 144 is then ready for emptying.

The invention claimed is:

1. A funnel made from flat material, wherein a blank of flat material is shaped to form a funnel-shaped sleeve comprising an outlet opening, an inlet opening, and an opening angle, wherein the funnel-shaped sleeve has at least one swaged subregion to effect enlargement of the opening angle, wherein a region of the outlet opening of the flat material is turned over such that the outlet opening is stiffened, and wherein recesses are provided for relieving stresses during creation of the region of the outlet opening of the flat material that is turned over, the recesses being provided at an edge of the blank of flat material that forms the outlet opening following shaping of the funnel-shaped sleeve.

2. The funnel as defined in claim 1, wherein the at least one swaged subregion adjoins the outlet opening and is constricted such that a substantially cylindrical outlet region is created.

3. The funnel as defined in claim 1, wherein the at least one swaged subregion includes ribs.

4. The funnel as defined in claim 1, wherein the region of the outlet opening of the flat material is turned over inwardly.

5. The funnel as defined in claim 1, wherein a region of the inlet opening of the flat material is turned over such that a substantially cylindrical edge is created.

6. The funnel as defined in claim 5, wherein the region of the inlet opening of the flat material is turned over outwardly.

7. The funnel as defined in claim 5, wherein the substantially cylindrical edge is an outer edge.

8. The funnel as defined in claim 1, wherein the blank of flat material used is a pre-fabricated ring segment and the blank of flat material, for the purpose of shaping the funnel-shaped sleeve, is placed on a wrapping mandrel and is joined at ends of the blank of flat material.

9. The funnel as defined in claim 1, wherein the funnel is made of plastic-coated paper.

10. The funnel as defined in claim 9, wherein the opening angle of the funnel is not constant over a peripheral region adjoining the outlet opening.

11. A receptacle for a pulverulent and/or liquid medium, an interior of which is at least partly defined by the funnel according to claim 1.

* * * * *